(12) United States Patent  (10) Patent No.: US 8,650,137 B2
Yuan  (45) Date of Patent: Feb. 11, 2014

(54) METHOD AND APPARATUS FOR CREATING STATE ESTIMATION MODELS IN MACHINE CONDITION MONITORING

(75) Inventor: Chao Yuan, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 361 days.

(21) Appl. No.: 13/123,626

(22) PCT Filed: Sep. 25, 2009

(86) PCT No.: PCT/US2009/058356
§ 371 (c)(1),
(2), (4) Date: Apr. 11, 2011

(87) PCT Pub. No.: WO2010/047917
PCT Pub. Date: Apr. 29, 2010

(65) Prior Publication Data
US 2011/0202488 A1    Aug. 18, 2011

Related U.S. Application Data

(60) Provisional application No. 61/106,699, filed on Oct. 20, 2008.

(51) Int. Cl.
*G06F 15/18* (2006.01)

(52) U.S. Cl.
USPC ............................................................ 706/12

(58) Field of Classification Search
None
See application file for complete search history.

(56) References Cited

U.S. PATENT DOCUMENTS

2007/0162241 A1* 7/2007 Yuan et al. ................... 702/81
2008/0086283 A1* 4/2008 Yuan et al. .................. 702/181

OTHER PUBLICATIONS

Gaussian Process Models for Robust Regression, Classification, and Reinforcement Learning Vorgelegt von Diplom Informatiker Malte Kuβ aus Wolfsburg.*

* cited by examiner

*Primary Examiner* — Kakali Chaki
*Assistant Examiner* — Ababacar Seck

(57) ABSTRACT

In a machine condition monitoring technique, related sensors are grouped together in clusters to improve the performance of state estimation models. To form the clusters, the entire set of sensors is first analyzed using a Gaussian process regression (GPR) to make a prediction of each sensor from the others in the set. A dependency analysis of the GPR then uses thresholds to determine which sensors are related. Related sensors are then placed together in clusters. State estimation models utilizing the clusters of sensors may then be trained.

25 Claims, 3 Drawing Sheets

METHOD AND APPARATUS FOR CREATING STATE ESTIMATION MODELS IN MACHINE CONDITION MONITORING

CLAIM OF PRIORITY

This application claims priority to, and incorporates by reference herein in its entirety, pending U.S. Provisional Patent Application Ser. No. 61/106.699, filed Oct. 20, 2008, and entitled "Method and Apparatus for Creating State Estimation Models in Machine Condition Monitoring."

FIELD OF THE DISCLOSURE

The present invention relates generally to machine condition monitoring for the purpose of factory automation. More specifically, the invention relates to techniques for building state estimation models describing a relation among a set of machine sensors.

BACKGROUND

The task of machine condition monitoring is to detect faults as early as possible to avoid further damage to a machine. This is usually done by analyzing data from a set of sensors, installed on different parts of a machine, for measuring temperature, pressure, vibrations, etc. When a machine is operating normally, all sensors obey a certain relationship. That relation can be described by the dependency of one sensor against other related sensors. During monitoring, violation of that relationship or dependency may indicate a fault. For example, in a gas turbine, given certain system inputs such as gas flow, inlet temperature and air humidity, the power output should be close to a predicted value. If the actual observed value deviates from that predicted value, the observation may indicate a system failure.

A fundamental step in machine condition monitoring is to build state estimation (SE) models that describe the relation among a set of sensors. During training, the SE model is trained to learn the sensor relationships from historical training data. During testing, for observed sensor values, the trained SE model is used to estimate the values that sensors should have if they operate normally.

One challenge in creating the SE model is that there are usually many sensors. In many circumstances, the relation among sensors is unknown. Sensors may monitor totally independent parts of the machine so that some sensors are not correlated with other sensors. If one simply builds a single SE model using all sensors, and estimates one sensor using the remaining sensors including unrelated sensors, performance of the SE model will be adversely affected.

In one approach, the SE model is constructed in two steps. First, pair-wise correlation scores of sensors are computed. The scores may be computed by standard correlation coefficients for linear cases, or by more sophisticated mutual information for nonlinear cases. In the second step, based on the correlation scores, a clustering method such as hierarchical clustering is applied to cluster sensors into groups. That approach is limited in that only pair-wise correlation between two sensors is used, and the approach thus cannot capture correlation involving more than two sensors, which exists extensively in complex machines.

Mutual information can be extended for multiple sensors, but that is at the cost of an exponential increase in computation time. In addition, mutual information usually requires discretization of continuous sensor signals, leading to a loss of precision.

There is therefore presently a need for an improved technique to partition sensors into groups, and to monitor machines using such groups. The technique should create groups wherein, within each group sensors are correlated, but between groups, sensors are not correlated. By using such groups, one SE model can be trained for each group.

SUMMARY OF THE INVENTION

In the present disclosure, a method is presented for grouping sensors by analyzing the dependency of one sensor against all remaining sensors. In particular, a Gaussian process regression method is employed to predict the target sensor (as output) from the remaining sensors (as inputs). A kernel function with automatic relevance determination is used such that each input sensor has its own kernel width. Those kernel widths are parameters and are learned from training data.

After training the SE model, two indications reveal information about sensor dependency. First, the noise variance of this Gaussian process model represents the overall dependency of the output against the inputs. The smaller the error is, the more dependent the output is.

Secondly, the kernel widths associated with different input sensors indicate the relative dependency of the output sensor against each input sensor. That is because the input sensors that are more relevant or related to the output sensor tend to have smaller kernel widths (and thus larger effects in kernel functions) than less relevant input sensors.

If the overall dependency is smaller than a threshold, it is determined that the output or target sensor does not depend on other sensors. If the relative dependency of an input sensor is smaller than a threshold, it is determined that this output or target sensor does not depend this input sensor. That dependency analysis is performed for every sensor, against all other sensors. Two sensors are correlated if one depends on the other. A new grouping algorithm is presented accordingly.

One embodiment of the invention is a method for grouping interrelated sensors of a set of sensors into clusters for use in state estimation models. In a computer, a separate Gaussian Process Regression is trained for each sensor in the set of sensors, wherein in a Gaussian Process Regression for a sensor y, the sensor y is a target sensor and d remaining sensors of the set are input sensors. The training uses a training set of signal values from the sensors to determine a noise variance v for the target sensor y and d kernel widths $s_k$. Each kernel width $s_k$ represents a relevance of a respective sensor k of the d input sensors in predicting a value of the sensor y.

A dependency analysis is then performed on each sensor of the sensor set by using the noise variance v and the kernel widths $s_k$ of the sensor to determine whether or not the sensor is correlated to each of the d other sensors. The sensors of the set of sensors are then grouped into clusters based on the dependency analysis.

In that method, the Gaussian Process Regression may be performed using a kernel function defined as:

$$k(x_i, x_j) = f \exp\left(-\frac{1}{2}\sum_{k=1}^{d}\frac{1}{s_k}(x_{ik} - x_{jk})^2\right) + \delta(i, j)v,$$

wherein $k(x_i, x_j)$ is an element of a covariance matrix for input samples $(x_i, x_j)$, f is a signal variance, $x_{ik}$ and $x_{jk}$ are kth elements of the vectors $x_i$ and $x_j$, respectively, and $\delta=1$ if i=j and 0 otherwise. The step of training a Gaussian process regression may utilize conjugate gradient methods.

The dependency analysis further include comparing the noise variance v of the sensor y to a first threshold $T_1$, and concluding that the sensor is not dependent on other sensors if v exceeds the threshold $T_1$, and that the sensor is dependent on other sensors if v is smaller than the threshold $T_1$; determining relative dependency weights $w_k$ of the sensor y on each of the remaining sensors k, the relative dependency weights $w_k$ being a function of a corresponding kernel width $s_k$; and determining whether pairs of sensors in the set of sensors are correlated by comparing the relative dependency weights $w_k$ between sensors of the sensor pairs to a second threshold $T_2$.

The relative dependency weight $w_k$ may be defined by $$w_k = \frac{1/s_k}{\sum_{k=1}^{d} 1/s_k}.$$

The relative dependencies of a sensor y may be determined only if the sensor y is determined to be dependent on other sensors.

The step of grouping the sensors into clusters may include initializing a sensor index set $Q=\{1, 2, \ldots, d\}$. The following is then performed until Q is empty: removing a first element i from Q, initializing two new index sets $Z=\{i\}$ and $G=\{i\}$, each containing a single index i, and performing the following: deleting a first element j from Z; identifying all sensors correlated to j; if an identified correlated sensor is not in G, then adding its index to Z and G and removing its index from Q: repeating the deleting, identifying and adding steps until Z is empty: and then outputting G as contents of a sensor cluster. The steps of removing a first element i, initializing two new index sets and performing are repeated until Q is empty.

Another embodiment of the invention is a method for monitoring a condition of one or more machines via a set of sensors installed on the machines. A training set of sensor signals is acquired, the signals comprising a series of simultaneous readings of the sensors. The above steps are then performed to group interrelated sensors of the set of sensors into clusters.

Cluster state estimation models are trained, each model having a target sensor and all input sensors in the same cluster. Target sensor signals are then predicted based on input sensor signals, using the trained cluster state estimation models. An alarm is generated if a predicted target sensor signal is sufficiently different from an actual sensor signal.

Another embodiment of the invention is a computer-usable medium having computer readable instructions stored thereon for execution by a processor to perform methods as described above.

DESCRIPTION

Figure 1:
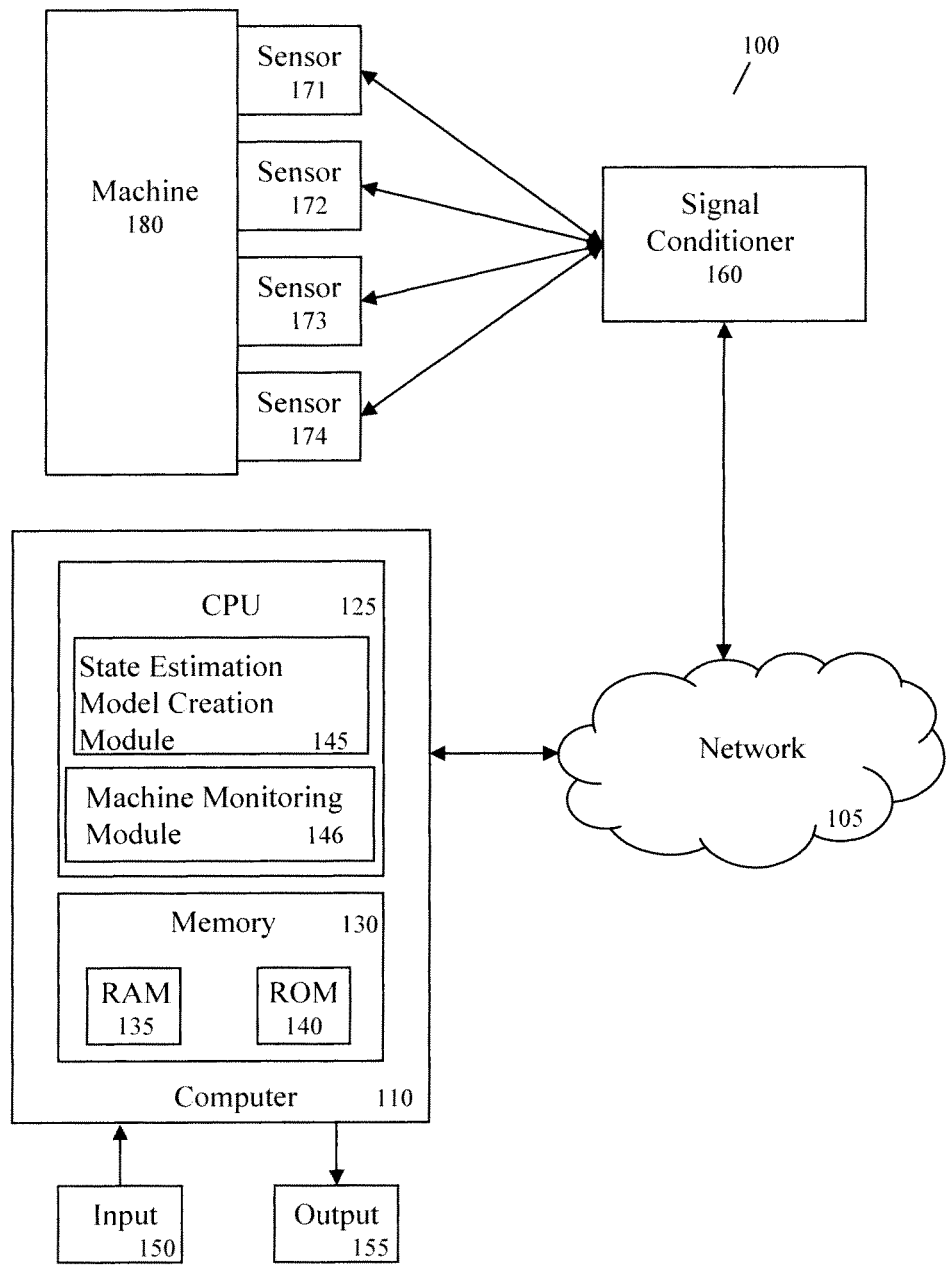
FIG. 1 is a schematic view showing a system according to the present disclosure.

The present invention may be embodied in a system for creating a state estimation model, which may be included in a machine monitoring system or may be a stand-alone system. FIG. 1 illustrates a system 100 for creating a state estimation model according to an exemplary embodiment of the present invention. As shown in FIG. 1, the system 100 includes a personal or other computer 110. The computer 110 may be connected to one or more sensors 171-174 over a wired or wireless network 105.

The sensors 171-174 are arranged to acquire data representing various characteristics of one or more machines or systems 180. The sensors measure characteristics of the machine 180 and its environment, such as temperature, pressure, humidity, rotational or linear speed, vibration, force, strain, power, voltage, current, resistance, flow rate, proximity, chemical concentration or any other characteristic. As noted above, groups of sensors may be related, in which case sensor signals from a group are predictors of signals of other sensors in the group. Some of the sensors may be independent, having no relationship with other sensors.

The sensors may be connected directly with the computer 110, or signals from the sensors may be conditioned by a signal conditioner 160 before being transmitted to the computer. Signals from sensors monitoring many different machines and their environments may be connected through the network 105 to the computer 110.

The computer 110, which may be a portable or laptop computer or a mainframe or other computer configuration, includes a central processing unit (CPU) 125 and a memory 130 connected to an input device 150 and an output device 155. The CPU 125 includes a state estimation model creation module 145 and that includes one or more methods for creating a state estimation model as discussed herein. Although shown inside the CPU 125, the module 145 can be located outside the CPU 125. The CPU may also contain a machine monitoring module 146 that utilizes the state estimation model in monitoring the machine 180. The machine monitoring module 146 may also be used in acquiring training data from the sensors 171-174 for use in creating the state estimation model.

The memory 130 includes a random access memory (RAM) 135 and a read-only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The program may reside on the ROM 140 or on any other computer-usable medium as computer readable instructions stored thereon for execution by the CPU 125 or other processor to perform the methods of the invention. The ROM 140 may also contain data for use by the programs, such as training data that is acquired from the sensors 171-174 or created artificially.

The input 150 may be a keyboard, mouse, network interface, etc., and the output 155 may be a liquid crystal display (LCD), cathode ray tube (CRT) display, printer, etc.

The computer 110 can be configured to operate and display information by using, e.g., the input 150 and output 155 devices to execute certain tasks. Program inputs, such as training data, etc., may be input through the input 150, may be stored in memory 130, or may be received as live measurements from the sensors 171-174.

Figure 2:
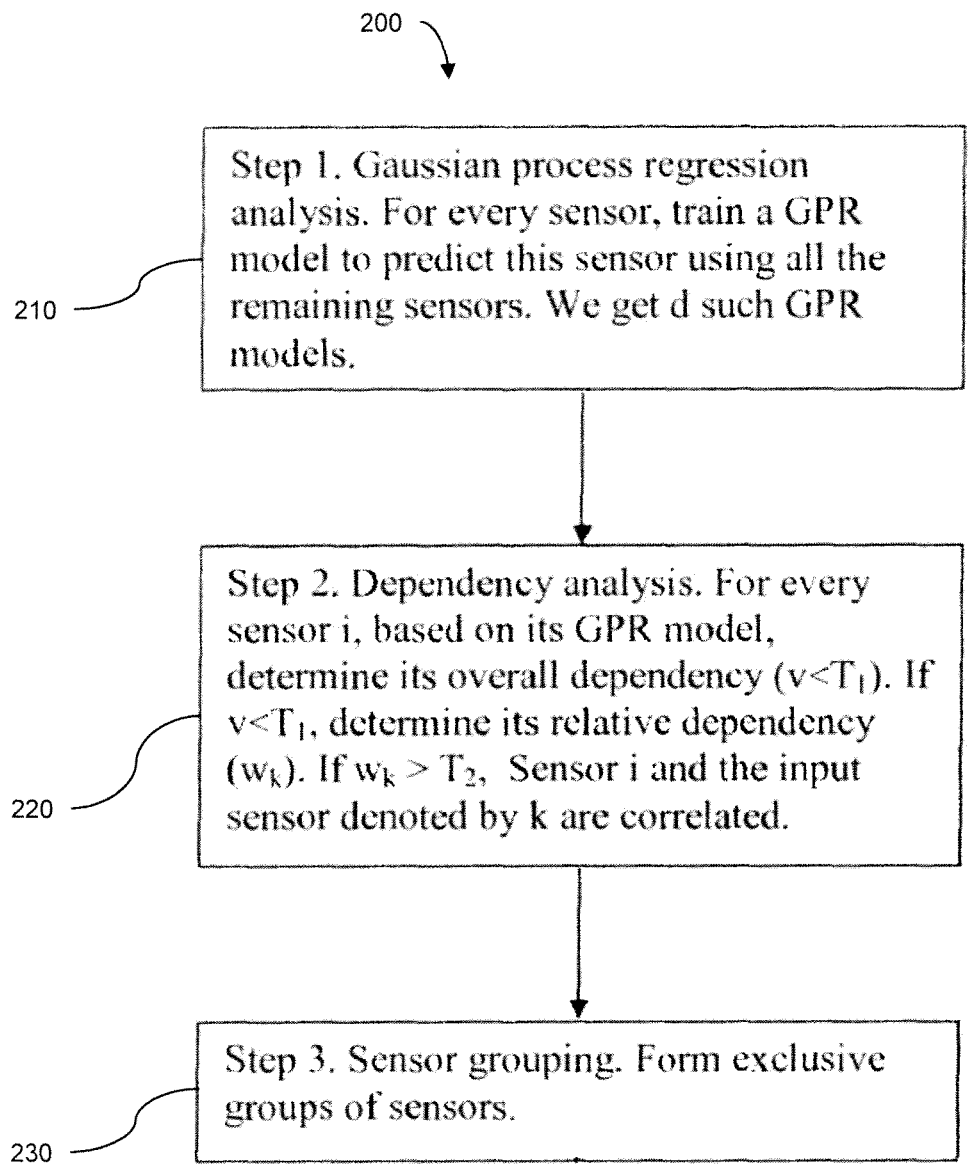
FIG. 2 is a flow diagram showing a technique for grouping sensors according to one embodiment of the invention.

Described herein is a method for creating astute estimation model for machine condition monitoring. A general procedure for creating the model is shown in FIG. 2, and described in more detail below. At step 210, a Gaussian process regression (GPR) analysis is performed. For each of d sensors, a GPR model is trained to predict the sensor using all the remaining sensors. A total of d GPR models are thereby created.

At step 220, a dependency analysis is performed. For every sensor i, based on its GPR model, an overall dependency is determined based on its noise variance v. If v is smaller than a threshold $T_1$, then a relative dependency $w_k$ is determined for all other sensors k relative to sensor i. If $w_k$ is greater than a threshold $T_2$ for any sensor k, then sensor i and sensor k are considered correlated.

The sensors are then grouped at step 230 according to their correlation. The groups are then used to create separate state estimation models for use in monitoring the condition of the subject machine or machines.

Each of the above steps will now be described in more detail.

Gaussian Process Regression Analysis

In initial step 210, a Gaussian process regression (GPR) is used to predict a sensor denoted by scalar y from all other d sensors denoted by a vector $x=[x_1, x_2, \ldots, x_d]^T$. Suppose that there are N training samples $\{(x_n, y_n)|n=1, 2, \ldots, N\}$. The GPR assumes that all training outputs, or an N-dimensional vector $Y=[y_1, y_2, \ldots, y_N]^T$, have a Gaussian distribution with zero mean and the N×N covariance matrix C whose element $C_{ij}=k(x_i, x_j)$. $k(x_i, x_j)$ is referred to as a kernel function between two input samples $x_i$ and $x_j$.

The form of the kernel function is defined as follows:

$$k(x_i, x_j) = f \exp\left(-\frac{1}{2}\sum_{k=1}^{d} \frac{1}{s_k}(x_{ik} - x_{jk})^2\right) + \delta(i, j)v \qquad (1)$$

In the above equation, there are d+2 parameters including the signal variance f, noise variance v and kernel width $s_k$ for the kth input sensor (where k=1, 2, . . . , d). $x_{ik}$ and $x_{jk}$ are the kth component of the velcors $x_i$, $x_j$, respectively. δ is the delta function, which takes 1 when i=j, and 0 otherwise.

The goal of training such GPRs is to maximize the log likelihood of the probability of Y over the parameters of f, v and $s_1, s_2, \ldots, s_d$. This is usually done by conjugate gradient methods. The estimated value of $s_k$ is usually quite different for different input sensors. If an input sensor is more relevant to predict the output sensor, the corresponding $s_k$ is usually small, so that sensor has a large effect in the kernel function (1). On the other hand, if an input sensor is not relevant to predict the output sensor, the corresponding kernel width $s_k$ is likely to be large and this input sensor becomes negligible in the kernel function. That behavior is often referred to as automatic relevance determination. During testing, given the input sensor values x, it is possible to estimate the corresponding y value or $\hat{y}=GPR(x)$ easily. An example of that estimation process is given with reference to the test results below.

Dependency Analysis

The dependency analysis of step 220 (FIG. 2) is now described. The predictive error of a GPR is indicated by the noise variance v learned from training. The larger v is, less accurate that GPR is. If y can be accurately predicted from other sensors via the GPR or the noise variance is small, it may be concluded that y is dependent on other sensors. Such dependency is referred to as overall dependency. If v is smaller than a threshold $T_1$, it is claimed that y is dependent on at least some other sensors.

If y passes the overall dependency check, the relative dependency of y on an input sensor k may be revealed by inspecting the corresponding kernel width $s_k$. Since the effect of a sensor on the kernel function (1) relies on the inverse of its kernel width $s_k$, the following relative dependency weight $w_k$ is defined as:

$$w_k = \frac{1/s_k}{\sum_{k=1}^{d} 1/s_k} \qquad (2)$$

Note that the sum of $w_k$ is one (1). If $w_k$ is larger than a threshold $T_2$, it may be concluded that the output sensor depends on the input sensor denoted by k, or this input sensor is relevant to y.

If the sensor i depends on sensor j or sensor j depends on sensor i, it is concluded that sensor i and sensor j are correlated and connect an edge between those two sensors.

Sensor Grouping Algorithm

In accordance with step 230 of FIG. 2, the sensors are now grouped using the results of the dependency analysis. All connected sensors are placed in one group, and no pair of connected sensors is separated into two groups. Sensors that are unconnected are placed in different groups. In one embodiment, connected sensors may be directly correlated, may each be correlated to another common sensor, or may be separated by several degrees by a chain of correlated sensors.

Figure 3:
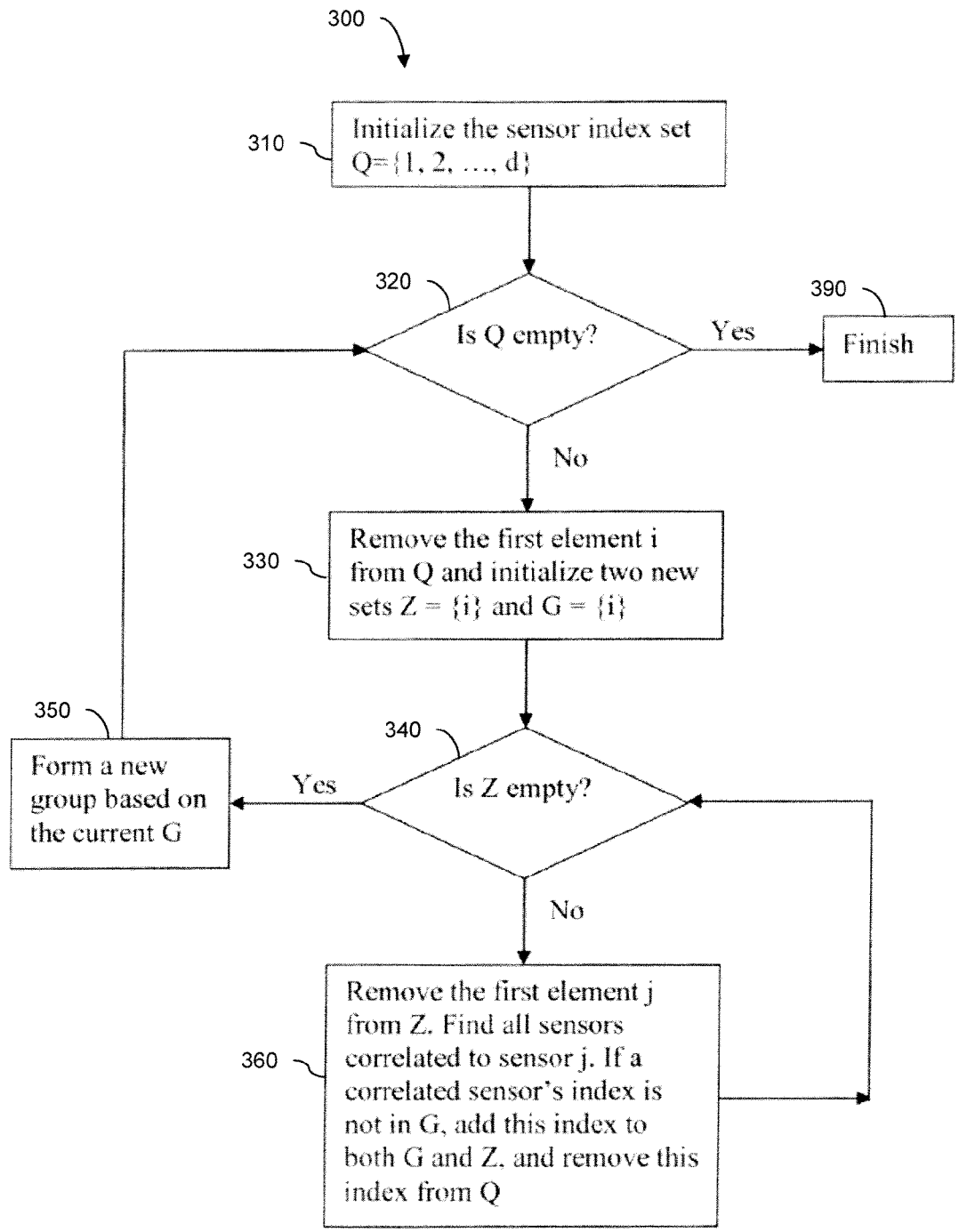
FIG. 3 is a flow diagram showing a technique for creating a state estimation model according to one embodiment of the invention.

In one embodiment of the invention, a technique 300 having a work flow as shown in FIG. 3 is used to group the sensors. A sensor index set Q is initialized at step 310. The sensor index set Q is used to indicate unprocessed sensors. If every sensor is processed and the sensor index set Q is empty at decision block 320, the algorithm is terminated at step 390.

Z is the sensor set representing unprocessed sensors for the current sensor group, and G includes all sensor indices which should be in the current sensor group. Those sets are initialized at step 330 for each new sensor from Q. The initialized sets Z and G each contain a single index for sensor i.

Once Z is empty, at decision block 340, G is output at step 350 for the current sensor group, and work flow returns to decision block 320.

If Z is not empty, the first element j is removed from Z at step 360. Based on the dependency analysis described above, all sensors that correlate with sensor j are found. If a correlated sensor's index is not in G, that index is added to both G and Z, and that index is removed from Q. The work flow then returns to step 340.

The resulting clusters of sensors may then be used in monitoring the condition of a machine or system. State estimation models are constructed for clusters containing related sensors. In a preferred embodiment, Gaussian process regression is used to construct a state estimation model for each sensor in a multi-sensor cluster, using other sensors in the cluster as input sensors. The state estimation models are then trained using the same training data as above, or using different training data. The models are then used to predict values for the sensors, and those predictions are compared to actual sensor signals. The machine condition monitoring system may output an alarm when a predicted value deviates from an actual value by more than some threshold quantity. Other modeling techniques, such as a trend analysis, may be used in cases where only a single sensor is contained in a cluster.

Test Results

To test the efficiency of the proposed algorithm, the following artificial data sets were created with nine variables representing nine sensors. The two variables $x_1$ and $x_2$ are independent and both have uniform distributions from [0,1]. The third $x_3$ is defined as:

$$x_3 = 0.3x_1 + 0.8x_2 + \text{noise}. \quad (3)$$

In addition, another three independent variables $x_4$, $x_5$, $x_6$ are added with uniform distributions from [0,1]. The seventh variable $x_7$ is defined by:

$$x_7 = \sin(8x_4 - 3) + 6\sqrt{1 - x_5^2} - 2x_6 + \text{noise}. \quad (6)$$

The noise terms in both (3) and (4) have a Gaussian distribution with zero mean and 0.1 standard deviation. Finally, two extra independent variables $x_8$ and $x_9$ are added with uniform distribution from [0,1]. Two hundred (200) training samples were randomly generated based on the above description. Each variable was normalized to zero mean and unit standard deviation.

It is clear that the first three variables have a linear relation while the next four variables have a complex nonlinear relation. Thus, ideally, there should be four groups and therefore four state estimation models. The first three sensors should be in one group; the next four sensors should be in another group; each of the remaining two sensors should form a separate new group.

The standard group methods-based pair-wise correlation does not work in this test because the first and second groups in this case both involve a higher dimension (i.e., greater than 2) correlation. For example, the correlation coefficients of $x_1$ against $x_2$ and $x_3$ are 0.0569, 0.2915, respectively. Since those numbers are very small, $x_1$ will not be included in the same group as $x_2$ and $x_3$ if traditional methods are used.

After the regression analysis of step 210 (FIG. 2), the following noise variances v are obtained for $x_1, x_2, \ldots, x_9$:

| 0.5538 | 0.1604 | 0.1585 | 0.9950 | 0.0316 | 0.0307 | 0.0039 | 0.9950 | 0.9942 |
|---|---|---|---|---|---|---|---|---|

As shown, the noise variances for $x_3$ and $x_7$ are relatively small, because, based on equations (3) and (4), those variables should be able to be predicted by other variables. On the other hand, the noise variances for $x_8$ and $x_9$ are very large because they are independent from other variables.

After the step 2 dependency analysis, the following relative dependency $w_k$ matrix is obtained:

| 0 | 0.5106 | 0.3996 | 0.0054 | 0.0001 | 0.0000 | 0.0001 | 0.0001 | 0.0841 |
|---|---|---|---|---|---|---|---|---|
| 0.2264 | 0 | 0.7712 | 0.0001 | 0.0002 | 0.0001 | 0.0018 | 0.0001 | 0.0001 |
| 0.2118 | 0.7860 | 0 | 0.0004 | 0.0000 | 0.0004 | 0.0007 | 0.0004 | 0.003 |
| 0.1449 | 0.0070 | 0.0596 | 0 | 0.6140 | 0.0106 | 0.1058 | 0.0057 | 0.0523 |
| 0.0000 | 0.0000 | 0.0000 | 0.7568 | 0 | 0.0230 | 0.2201 | 0.0000 | 0.0000 |
| 0.0000 | 0.0000 | 0.0000 | 0.7989 | 0.1579 | 0 | 0.0431 | 0.0000 | 0.0000 |
| 0.0000 | 0.0000 | 0.0000 | 0.5799 | 0.4182 | 0.0018 | 0 | 0.0000 | 0.0000 |
| 0.0284 | 0.0277 | 0.0394 | 0.0011 | 0.0006 | 0.0040 | 0.8985 | 0 | 0.0004 |
| 0.0768 | 0.0135 | 0.0260 | 0.0560 | 0.0545 | 0.0142 | 0.7377 | 0.0213 | 0 |

The ith row of the above matrix represents the corresponding relative dependency for the remaining variables. For example, the second row indicates results of predicting $x_2$ from all other variables. $x_3$ has the largest relative dependency (0.7712); $x_1$ also has a relatively large value (0.2264). All the other variables have very small relative dependencies. That is expected because $x_2$ is correlated with $x_1$ and $x_3$, but independent from the remaining variables.

In this test, the threshold for overall dependency was set to $T_1 = 0.3$ and the threshold for relative dependency was set to $T_2 = 0.01$. With those settings, $x_1$, $x_4$, $x_8$ and $x_9$ are not dependent on other variables because they fail the overall dependency test. Thus the corresponding rows of the relative dependency matrix are ignored. After the overall dependency and relative dependency tests, the following correlation matrix is produced:

| 0 | 1 | 1 | 0 | 0 | 0 | 0 | 0 | 0 |
|---|---|---|---|---|---|---|---|---|
| 1 | 0 | 1 | 0 | 0 | 0 | 0 | 0 | 0 |
| 1 | 1 | 0 | 0 | 0 | 0 | 0 | 0 | 0 |
| 0 | 0 | 0 | 0 | 1 | 1 | 1 | 0 | 0 |
| 0 | 0 | 0 | 1 | 0 | 1 | 1 | 0 | 0 |
| 0 | 0 | 0 | 1 | 1 | 0 | 1 | 0 | 0 |
| 0 | 0 | 0 | 1 | 1 | 1 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

If there is a "1" at the ith row and the jth column, the variable i and variable j are correlated.

After performing the sensor grouping algorithm using the correlation matrix, the variables are clustered into the following four groups:

Group 1: {1, 2, 3}

Group 2: {4, 5, 6, 7}

Group 3: {8}

Group 4: {9}

Those groups exactly match the ground truth.

CONCLUSION

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for grouping interrelated sensors of a set of sensors into clusters for use in state estimation models, the method comprising:
   (A) in a computer, training a separate Gaussian Process Regression for each sensor in the set of sensors, wherein in a Gaussian Process Regression for a sensor y, the sensor y is a target sensor and d remaining sensors of the set are input sensors, the training using a training set of signal values from the sensors to determine a noise variance v for the target sensor y and d kernel widths $s_k$, each kernel width $s_k$ representing a relevance of a respective sensor k of the d input sensors in predicting a value of the sensor y;
   (B) performing a dependency analysis on each sensor of the sensor set by using the noise variance v and the kernel widths $s_k$ of the sensor to determine whether or not the sensor is correlated to each of the d other sensors; and
   (C) grouping sensors of the set of sensors into clusters based on the dependency analysis, wherein sensors grouped in each cluster are removed from a sensor index set containing unprocessed sensors used in grouping of sensors into clusters.

2. The method of claim 1, wherein the Gaussian Process Regression is performed using a kernel function defined as:

$$k(x_i, x_j) = f \exp\left(-\frac{1}{2}\sum_{k=1}^{d}\frac{1}{s_k}(x_{ik} - x_{jk})^2\right) + \delta(i, j)v,$$

wherein $k(x_i, x_j)$ is an element of a covariance matrix for input samples $(x_i, x_j)$, f is a signal variance, $x_{ik}$ and $x_{jk}$ are kth elements of the vectors $x_i$ and $x_j$, respectively, and $\delta(i,j)=1$ if i=j and 0 otherwise.

3. The method of claim 1, wherein the step of training a Gaussian process regression utilizes conjugate gradient methods.

4. The method of claim 1, wherein the dependency analysis further comprises
   (1) comparing the noise variance v of the sensory to a first threshold $T_1$, and concluding that the sensor is not dependent on other sensors if v exceeds the threshold $T_1$, and that the sensor is dependent on other sensors if v is smaller than the threshold $T_1$;
   (2) determining relative dependency weights $w_k$ of the sensory on each of the remaining sensors k, the relative dependency weights $w_k$ being a function of a corresponding kernel width $s_k$; and
   (3) determining whether pairs of sensors in the set of sensors are correlated by comparing the relative dependency weights $w_k$ between sensors of the sensor pairs to a second threshold $T_2$.

5. The method of claim 4, wherein the relative dependency weight $w_k$ is defined by:

$$w_k = \frac{1/s_k}{\sum_{k=1}^{d} 1/s_k}.$$

6. The method of claim 4, wherein the relative dependencies of a sensory are determined only if the sensory is determined to be dependent on other sensors.

7. The method of claim 1, wherein the step of grouping the sensors into clusters comprises:
   initializing a sensor index set Q={1, 2, . . . , d};
   until Q is empty, removing a first element i from Q, initializing two new index sets Z={i} and G={i}, each containing a single index i, and performing the following:
   deleting a first element j from Z;
   identifying all sensors correlated to j;
   if an identified correlated sensor is not in G, then adding its index to Z and G and removing its index from Q;
   repeating the deleting, identifying and adding steps until Z is empty; and then outputting G as contents of a sensor cluster; and
   repeating the steps of removing a first element i, initializing two new index sets and performing until Q is empty.

8. A method for monitoring a condition of one or more machines via a set of sensors installed on the machines, the system comprising:
   (A) acquiring a training set of sensor signals comprising a series of simultaneous readings of the sensors;
   (B) in a computer, training a separate Gaussian Process Regression for each sensor in the set of sensors, wherein in a Gaussian Process Regression for a sensor y, the sensor y is a target sensor and d remaining sensors of the set are input sensor values, the training using the training set of signals from the sensors to determine a noise variance v for the target sensor y and d kernel widths Sk, each kernel width Sk representing a relevance of a respective sensor k of the d input sensors in predicting a value of the sensor y;
   (C) performing a dependency analysis on each sensor of the sensor set by using the noise variance v and the kernel widths Sk of the sensor to determine whether or not the sensor is correlated to each of the d other sensors;
   (D) grouping sensors of the set of sensors into clusters based on the dependency analysis, wherein sensors grouped in each cluster are removed from a sensor index set containing unprocessed sensors used in grouping of sensors into clusters;
   (E) training cluster state estimation models having a target sensor and all input sensors in the same cluster;
   (F) predicting target sensor signals based on input sensor signals, using the trained cluster state estimation models; and
   (G) generating an alarm if a predicted target sensor signal is sufficiently different from an actual sensor signal.

9. The method of claim 8, wherein the steps of training cluster state estimation models, predicting and generating are performed by the same computer as the step of training a separate Gaussian Process Regression for each sensor in the set of sensors.

10. The method of claim 8, wherein the cluster state estimation models are Gaussian Process Regressions.

11. The method of claim 8, wherein a predicted target sensor signal is sufficiently different from an actual sensor signal when a difference between those values exceeds a threshold.

12. The method of claim 8, further comprising the following step:
   predicting a signal of a target sensor in a cluster containing no other sensors using historical data from the target sensor.

13. The method of claim 8, wherein the Gaussian Process Regression is performed using a kernel function defined as:

$$k(x_i, x_j) = f \exp\left(-\frac{1}{2}\sum_{k=1}^{d}\frac{1}{s_k}(x_{ik} - x_{jk})^2\right) + \delta(i, j)v,$$

wherein $k(x_i, x_j)$ is an element of a covariance matrix for input samples $(x_i, x_j)$, f is a signal variance, $x_{ik}$ and $x_{jk}$ are kth elements of the vectors $x_i$ and $x_j$, respectively, and $\delta(i,j)=1$ if i=j and 0 otherwise.

14. The method of claim 8, wherein the step of training a Gaussian Process Regression utilizes conjugate gradient methods.

15. The method of claim 8, wherein the dependency analysis further comprises
   (1) comparing the noise variance v of the sensory to a first threshold $T_1$, and concluding that the sensor is not dependent on other sensors if v exceeds the threshold $T_1$, and that the sensor is dependent on other sensors if v is smaller than the threshold $T_1$;
   (2) determining relative dependency weights $w_k$ of the sensory on each of the remaining sensors k, the relative dependency weights $w_k$ being a function of a corresponding kernel width $s_k$; and
   (3) determining whether pairs of sensors in the set of sensors are correlated by comparing the relative dependency weights $w_k$ between sensors of the sensor pairs to a second threshold $T_2$.

16. The method of claim 15, wherein the relative dependency weight $w_k$ is defined by:

$$w_k = \frac{1/s_k}{\sum_{k=1}^{d} 1/s_k}.$$

17. The method of claim 15, wherein the relative dependencies of a sensory are determined only if the sensory is determined to be dependent on other sensors.

18. The method of claim 8, wherein the step of grouping the sensors into clusters comprises:
   initializing a sensor index set $Q=\{1, 2, \ldots, d\}$;
   until Q is empty, removing a first element i from Q, initializing two new index sets $Z=\{i\}$ and $G=\{i\}$, each containing a single index i, and performing the following:
      deleting a first element j from Z;
      identifying all sensors correlated to j;
      if an identified correlated sensor is not in G, then adding its index to Z and G and removing its index from Q;
      repeating the deleting, identifying and adding steps until Z is empty; and then outputting G as contents of a sensor cluster; and
   repeating the steps of removing the first element i, initializing two new index steps and performing until Q is empty.

19. A system for grouping interrelated sensors of a set of sensors into clusters for use in state estimation models, the system comprising a processor and a non-transitory computer readable medium having computer readable instructions stored thereon that, when executed by the processor, perform operations comprising:
   (A) training a separate Gaussian Process Regression for each sensor in the set of sensors, wherein in a Gaussian Process Regression for a sensor y, the sensor y is a target sensor and d remaining sensors of the set are input sensors, the training using a training set of signal values sk from the sensors to determine a noise variance v for the target sensor y and d kernel widths Sk, each kernel width Sk representing a relevance of a respective sensor k of the d input sensors in predicting a value of the sensor y;
   (B) performing a dependency analysis on each sensor of the sensor set by using the noise variance v and the kernel widths Sk of the sensor to determine whether or not the sensor is correlated to each of the d other sensors; and
   (C) grouping sensors of the set of sensors into clusters based on the dependency analysis, wherein sensors grouped in each cluster are removed from a sensor index set containing unprocessed sensors used in grouping of sensors into clusters.

20. The system of claim 19, wherein the Gaussian Process Regression is performed using a kernel function defined as:

$$k(x_i, x_j) = f \exp\left(-\frac{1}{2}\sum_{k=1}^{d}\frac{1}{s_k}(x_{ik} - x_{jk})^2\right) + \delta(i, j)v,$$

wherein $k(x_i,x_j)$ is an element of a covariance matrix for input samples $(x_i,x_j)$, f is a signal variance, $x_{ik}$ and $x_{jk}$ are kth elements of the vectors $x_i$ and $x_j$, respectively, and $\delta(i,j)=1$ if i=j and 0 otherwise.

21. The system of claim 19, wherein the step of training a Gaussian process regression utilizes conjugate gradient methods.

22. The system of claim 19, wherein the dependency analysis further comprises
   (1) comparing the noise variance v of the sensory to a first threshold $T_1$, and concluding that the sensor is not dependent on other sensors if v exceeds the threshold $T_1$, and that the sensor is dependent on other sensors if v is smaller than the threshold $T_1$;
   (2) determining relative dependency weights $w_k$ of the sensory on each of the remaining sensors k, the relative dependency weights $w_k$ being a function of a corresponding kernel width $s_k$; and
   (3) determining whether pairs of sensors in the set of sensors are correlated by comparing the relative dependency weights $w_k$ between sensors of the sensor pairs to a second threshold $T_2$.

23. The system of claim 22, wherein the relative dependency weight $w_k$ is defined by:

$$w_k = \frac{1/s_k}{\sum_{k=1}^{d} 1/s_k}.$$

24. The system of claim 22, wherein the relative dependencies of a sensory are determined only if the sensory is determined to be dependent on other sensors.

25. The system of claim 19, wherein the step of grouping the sensors into clusters comprises:
   initializing a sensor index set $Q=\{1, 2, \ldots, d\}$;

until Q is empty, removing a first element i from Q and initializing two new index sets Z={i} and G={i}, each containing a single index i, and performing the following:

deleting a first element j from Z;
identifying all sensors correlated to j;
if an identified correlated sensor is not in G, then adding its index to Z and G and removing its index from Q;
repeating the deleting, identifying and adding steps until Z is empty; and then outputting G as contents of a sensor cluster; and repeating the steps of removing the first element i, initializing two new index sets and performing until Q is empty.

* * * * *